United States Patent [19]

Sakimori et al.

[11] Patent Number: 4,887,341
[45] Date of Patent: Dec. 19, 1989

[54] METHOD AND APPARATUS FOR FITTING COMPONENT SECTIONS

[75] Inventors: Hideharu Sakimori, Hiroshima; Yoji Komatsu, Yamagushi; Masahiro Ito, Akashi; Nobuyoshi Ohkuma, Kashiwara, all of Japan

[73] Assignee: Mazda Motor Corporation, Hiroshima, Japan

[21] Appl. No.: 91,934

[22] Filed: Sep. 1, 1987

[30] Foreign Application Priority Data

Sep. 1, 1986 [JP] Japan .................................. 61-206550
Oct. 9, 1986 [JP] Japan .................................. 61-241040

[51] Int. Cl.⁴ ...................... B23P 19/00; B23P 21/00; B25J 15/10
[52] U.S. Cl. ...................... 29/156.4 R; 29/430; 29/464; 29/469; 29/525.1; 29/771; 29/795; 29/822; 414/225; 414/736; 901/7
[58] Field of Search .......... 29/156.4 R, 430, 701–704, 29/568, 771, 33 P, 526 R, 795, 822, 525.1, 464, 469; 414/225, 226, 736, 737; 901/6, 7, 37, 31, 32, 39, 40

[56] References Cited

U.S. PATENT DOCUMENTS 4,268,945 5/1981 Van Arman et al. .......... 29/156.4 R
4,604,797 8/1986 Kitamura et al. ..................... 29/430
4,673,075 6/1987 Ueyama et al. ........................ 29/703

FOREIGN PATENT DOCUMENTS 0143409 8/1980 German Democratic Rep. ................................ 29/156.4 R
20135 5/1981 Japan ..................................... 29/430

Primary Examiner—Rodney B. Bovernick
Assistant Examiner—R. D. Shafer
Attorney, Agent, or Firm—Fleit, Jacoboson, Cohn, Price, Holman & Stern

[57] ABSTRACT

A method and apparatus for fitting, by a manipulator, a cylinder head to an engine block in proper registry relative to each other through engageable locating pins and recesses prior to assembling rigidly with a plurality of coupling bolts into one whole integral body in an automatic assembling line. The engine block is formed with bolt engaging bores and is placed on the main assembly line. Coupling bolts are inserted through bolt receiving bores formed in the cylinder head with the bolts protruding. The cylinder head is brought from an auxiliary assembly line and set on the engine block while inserting the protruding coupling bolts into the bolt engaging bores and thereby the cylinder head is securely, albeit temporarily, held on the engine block pending tightening of the coupling bolts even if the locating pins and recesses are not perfectly aligned.

25 Claims, 10 Drawing Sheets

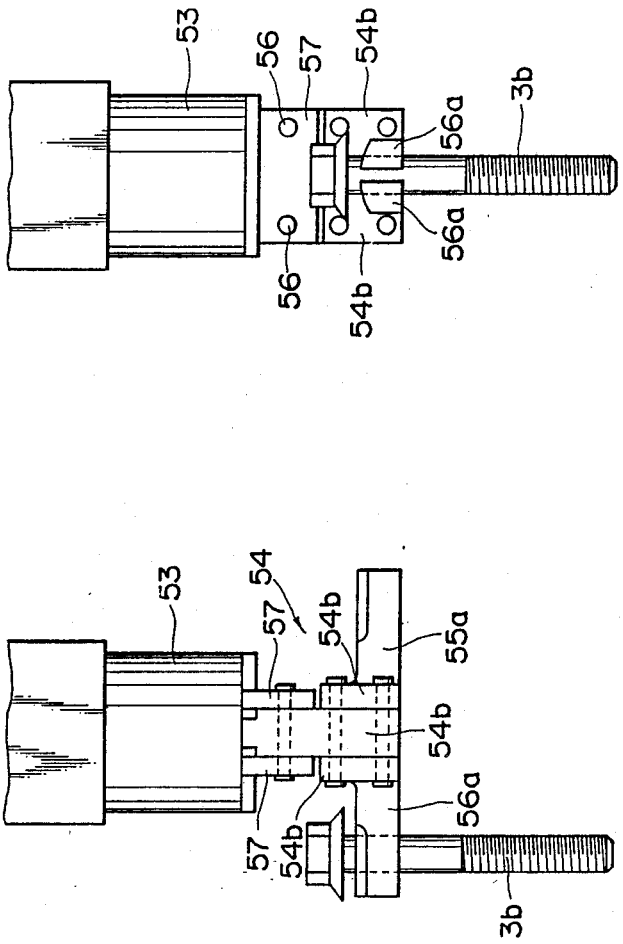

METHOD AND APPARATUS FOR FITTING COMPONENT SECTIONS

BACKGROUND OF THE INVENTION

The present invention relates to a method and apparatus for fitting component sections together, and more particularly to a method and apparatus for fitting two component sections together and temporarily holding them together prior to assembling the component sections together rigidly into the whole integrated body with coupling bolts in an automatic assembling line.

Various methods and apparatus have heretofore been used to fit together two component sections, for example, an engine cylinder block and its cylinder head, with a high accuracy of registry relative to each other prior to rigidly fixing, and thereby assembling, the two component sections with coupling bolts into one whole integrated body.

One such apparatus is disclosed in Japanese Patent Publication No. 56-20,135, entitled "Automatic Assembling Apparatus," issued May 12, 1981. In the apparatus taught by the above-mentioned Japanese patent publication, one component section having at least two locating pins is placed on the other component section in proper registry by fitting the locating pins in corresponding recesses formed in the other component section. This fitting is well known in the art as a locating pin fitting method.

Another known method is a so-called faucet fitting method in which spigots having a certain shape are formed on one component section and are fitted into complementarily shaped sockets formed in the other component section to set up the two component sections in proper registry relative to each other.

When employing any method of the above type wherein two component sections are fitted together in proper registry prior to being rigidly fixed, and thereafter being assembled into one body, by means of a plurality of tightening elements such as coupling bolts, a serious problem exists when the two component sections are assembled into one complete body with the aid of, in particular, an industrial robot or a manipulator in an automatic assembling line. Any error of registry between the two component sections results in an improper fitting or a mis-fitting between the spigot and its associated socket or the locating pin and its associated recess. If the two component sections fitted together are transferred either directly or indirectly to a next step, for example, a fixing step, of an automatic assembling process while an improper fitting or a mis-fitting still exists between the spigot and its associated socket or the locating pin and its associated recess, there rises a great possibility that one component section will accidentally slip off from the other and fall down during the transferring thereof.

For getting the highest state of efficiency in assembling the component sections into one whole body, an industrial robot or a manipulator is widely used to set a plurality of coupling bolts in one or both component sections one by one. Such an industrial robot or a manipulator has a bolt gripping hand provided with clamping fingers, which clamping fingers are adapted to open and close in order to clamp and unclamp a coupling bolt. Upon inserting the coupling bolt into a bolt receiving bore or bolt hole in a component section, the clamping fingers open to unclamp the coupling bolt, permitting it to fall into the bolt receiving bore. Because the component sections generally have complicated rugged outer configurations, and because the opening of the bolt hole through which the coupling bolt is being inserted is often recessed, the bolt gripping hand, in particular the bolt clamping finger, of a manipulator may interfere with the opening of the bolt receiving bore when the bolt clamping fingers open to unclamp the coupling bolt. Also, the clamping fingers themselves and/or the component section is liable to be damaged during setting of the bolts in the bolt holes.

Furthermore, since ordinary machine bolts come in various types of polygonal heads, for example, octagon heads, clamping the bolt head positively between the clamping fingers of the gripping hand of the robot or the manipulator is difficult. Uncertain clamping results in unsuccessful setting of coupling bolts in counter bores.

OBJECT OF THE PRESENT INVENTION

It is, therefore, an object of the present invention to provide a method and apparatus for securely fitting together two component sections with the aid of a manipulator prior to being fixedly assembled with coupling bolts into one whole integrated body in an automatic assembling line.

It is another object of the present invention to provide a method and apparatus for fitting together two component sections to ensure that they will not slip off one from the other during transfer to a next step even if the two component sections are in improper registry.

It is still another object of the present invention to provide a method in which a plurality of coupling bolts can be set all at once into bolt receiving bores formed in one component section to be fitted to another component section prior to an assembling of the two component sections by the plurality of coupling bolts in an automatic assembling line.

It is a further object of the present invention to provide an apparatus which can set securely and quickly a plurality of coupling bolts all at once in bolt receiving bores formed in one component section which is later rigidly fixed to another component section by the coupling bolts.

It is a still further object of the present invention to provide an apparatus which can set a plurality of coupling bolts, all at once, into bolt receiving bores formed in one component section without any damage to the bolt gripping means of the apparatus and/or the component section.

SUMMARY OF THE INVENTION

For accomplishing the above and other objects, the method and apparatus of the present invention enables inserting a plurality of coupling bolts through bolt receiving bores formed in one component section by means of a manipulator, and setting the one component section onto another component section placed at a predetermined position in an automatic assembling line by means of a manipulator while inserting the coupling bolts into threaded bores formed in the other component section. According to the present invention, even though one of the two component sections is provided with at least one locating element and the other component section with an element engageable with the locating element, the two component sections can be fitted together and the coupling bolts can be inserted into and brought into a secure engagement with the threaded bores prior to the fitting engagement between the locating and engageable elements. One component section is prevented from slipping off and falling down or being separated from the other component section during transfer or upon assembly of the two component sections even though there is an error of fitting or registry between the locating and engageable elements.

According to a feature of a preferred embodiment of the present invention, a gripping hand of a manipulator grips and inserts, at first, one set of coupling bolts through one of two series of bolt receiving bores formed in one component section which is fixed to another component section so as to be assembled into one whole body and then another set of coupling bolts through the other series of bolt receiving bores. The gripping hand is adapted to be mounted on and demounted from the manipulator and comprised by a plurality of gripping heads to which two series of clamping fingers are attached on both sides thereof to clamp the coupling bolts set by set. Each gripping head is operated to unclamp the coupling bolt after inserting it into the bolt receiving bore to some extent and thereafter to move horizontally laterally so as to permit the coupling bolt to fall fully in the bolt receiving bore.

According to another feature of a preferred embodiment of the present invention, the plurality of gripping heads is supported for sliding movement on a member adapted to be mounted on and demounted from the manipulator. Due to the ability for sliding movement of the gripping head, the gripping heads can be displaced relative to each other to adjust the distances therebetween so as to be available to various component sections which have different distances between bolt receiving bores.

BRIEF DESCRIPTION OF THE DRAWINGS

These and other objects and features of the present invention will become apparent from the following description taken in conjunction with the preferred embodiment thereof with reference to the accompanying drawings, in which:

FIG. 6A is a side view, similar to FIG. 5A, of a bolt gripping head with a coupling bolt clamped;

FIG. 6B is a front view, similar to FIG. 5B, of a bolt gripping head with a coupling bolt clamped;

DETAILED DESCRIPTION OF THE INVENTION

Although the method and apparatus of the present invention may be used in any situation where two component sections or parts are fitted together prior to being rigidly fixed with coupling bolts and thereafter assembled into an integrated body in an automatic assembling line, it will be specifically described with reference to the assembly of an automobile engine body, in particular, a V-type six-cylinder automobile engine body.

The method and apparatus according to the present invention include the use of industrial robots or manipulators in an automatic assembling line for assembling an automobile engine body. Because such robots or manipulators and such engine bodies are well known to those skilled in the art, no detailed description of these apparatuses is included herein. It is to be understood that the two component sections themselves and the robot or manipulator may take any of various forms well known to those skilled in the art.

Figure 1:
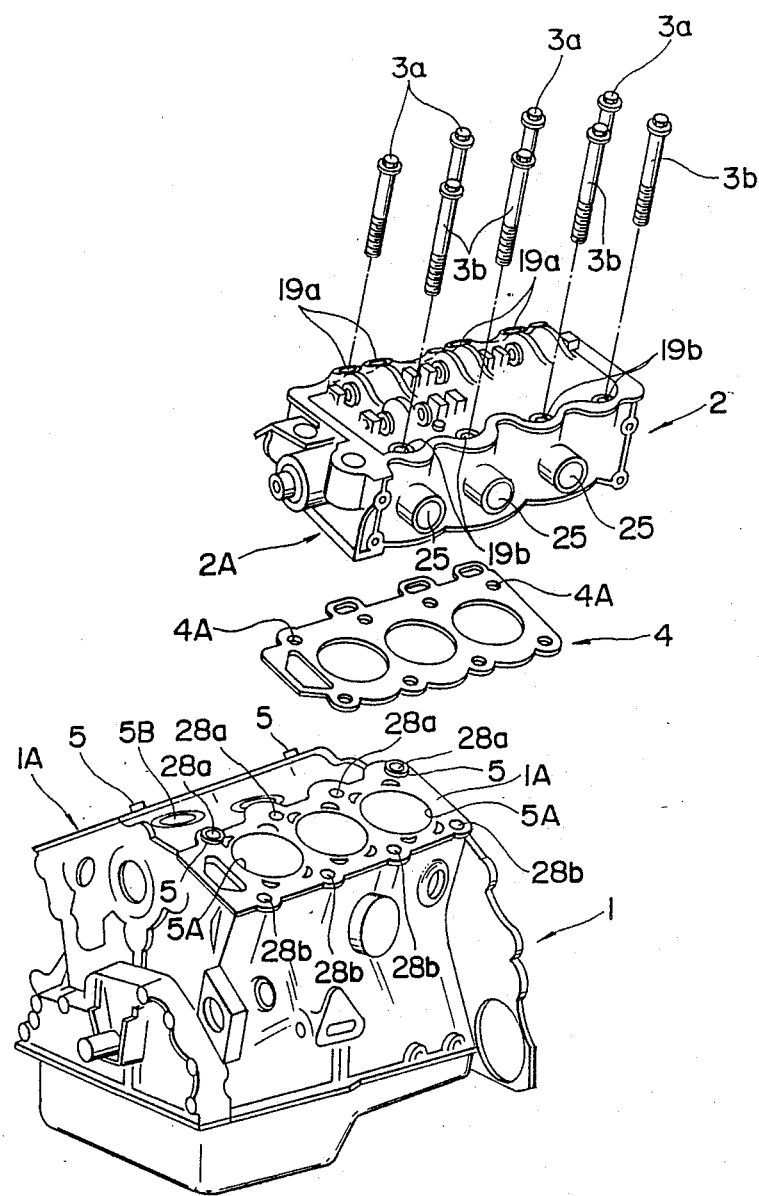
FIG. 1 is an exploded perspective view of an engine body showing component sections fitted together in accordance with the method of the present invention and, then, fixedly assembled in an automatic assembling line.
Figure 10:
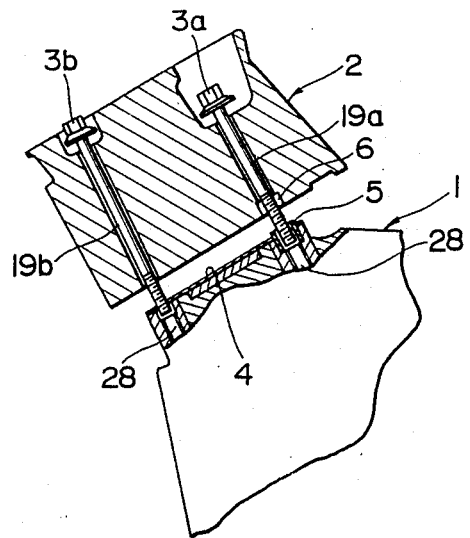
FIG. 10 is a partially sectional fragmentary schematic illustration of the component sections during the fitting thereof.

Referring now to the drawings wherein like reference characters designate corresponding elements, parts, or sections throughout several views, a preferred embodiment will now be described. FIG. 1 shows a V-type six-cylinder engine body having two series of cylinder bores 5A (one series of which is hidden). The engine body is composed of two engine body component sections, namely, a cylinder block 1 and a cylinder head 2, which are assembled together. As is well known in the art, a cylinder engine gasket 4 is laid between fitting surfaces 1A and 2A of the cylinder block 1 and the cylinder head 2, respectively. The cylinder block 1 has two top fitting surfaces 1A in each of which is located a series of cylinder bores 5A and two series, namely, an inner and an outer series, of threaded bores 28a and 28b, respectively. The bores 28a and 28b lie on opposite sides of the series of cylinder bores 5A. The outermost end bores of the inner series of threaded bores 28a are formed with recesses or sockets of an enlarged diameter at surface 1A which enlarge the top openings of these outermost end threaded bores 28a. Into each socket, a locating pin 5 in the form of a sleeve-shaped bush is fitted. Arranged correspondingly to the respective series of threaded bores 28a and 28b, the cylinder head 2 is provided with two series of bolt receiving bores 19a, 19b piercing therethrough. In the bottom fitting surface 2A of the cylinder head 2, there is formed a recess 6 (see FIGS. 10 and 11) enlarging the bottom opening of the bolt receiving bore on each end of the series of the bolt receiving bores 19a. Each locating pin 5 is adapted to fit into a corresponding recess 6 when the cylinder block 1 and the cylinder head 2 are brought into proper registry upon assembling the cylinder head 2 onto the cylinder block 1. The cylinder block 1 and head 2 are designed to be rigidly or integrally fixed by two groups of coupling bolts 3a and 3b and thereby to be assembled into one whole integrated engine body. Usually one group of bolts 3b has an overall length greater or longer than the overall length of the other group of bolts 3a.

Figure 2:
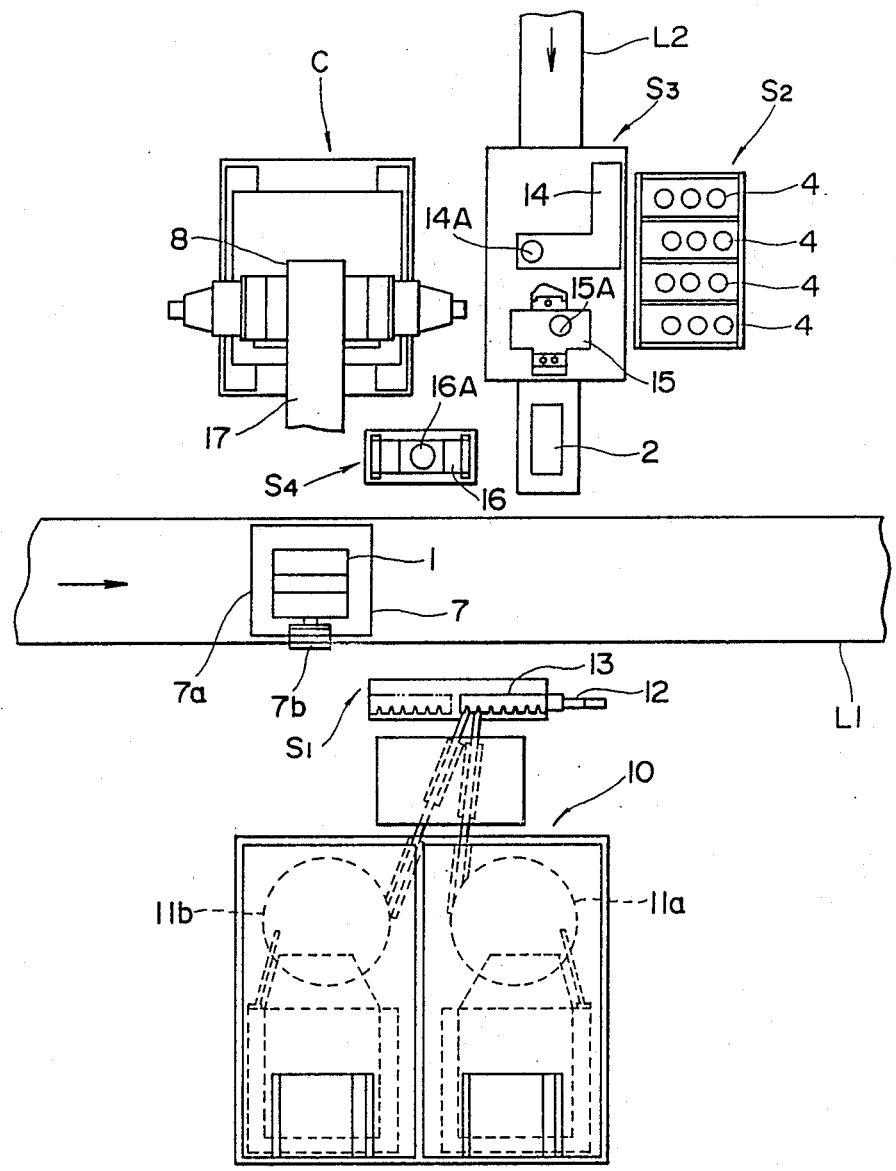
FIG. 2 is a schematic plan view diagrammatically illustrating a part of an automatic engine body assembling line embodying the novel concepts of the present invention.
Figure 3:
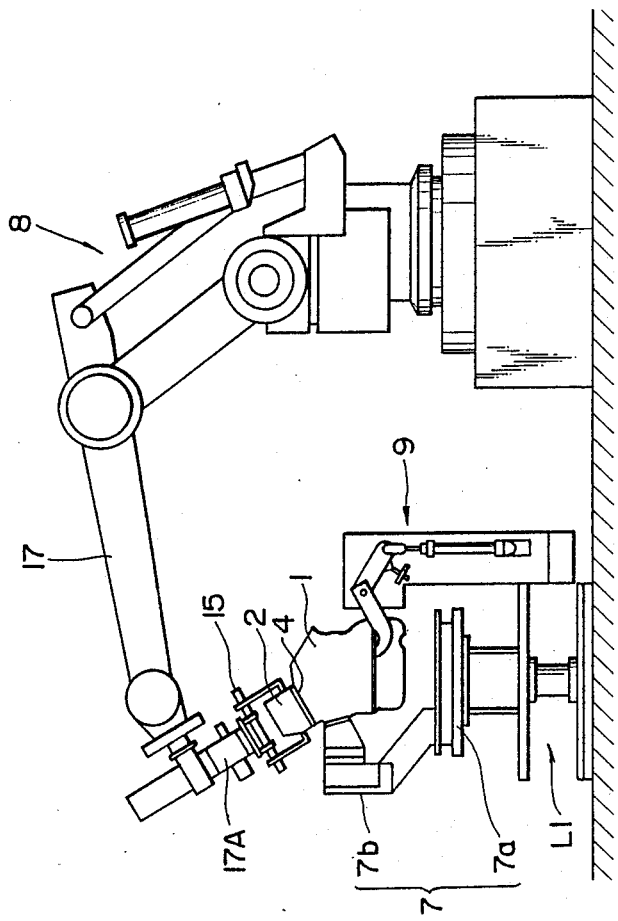
FIG. 3 is an illustration of apparatus suitable for carrying out the present invention.
Figure 4:
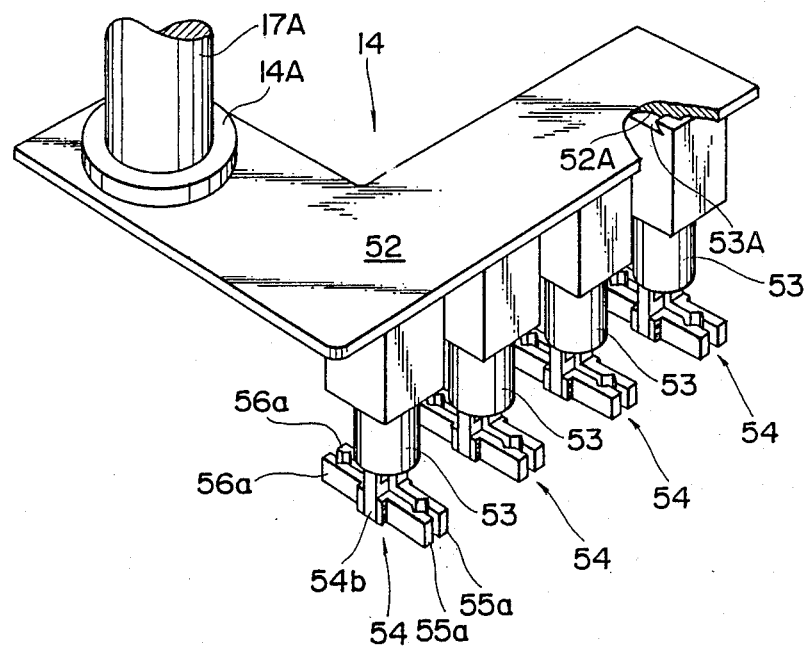
FIG. 4 is a partially cutaway view in perspective of a bolt gripper.

Referring now to FIGS. 2 and 3, part of an automatic assembling line and associated installations are illustrated. As shown, a main-assembling line L1 includes a conveyer for conveying engine blocks 1 placed on positioning jig pallets 7. Only one pallet 7 is shown in FIG. 2. A sub-assembling line L2, arranged substantially perpendicularly to the conveying direction of the main-assembling line L1, includes a sub-conveyer for conveying the cylinder heads 2, only one of which is shown. A program-controlled manipulator 8, well known per se to those skilled in the art, is disposed in a space C enclosed or bounded by the main- and sub-assembling lines L1 and L2. As is clearly seen in FIG. 3, the positioning jig pallet 7 comprises a pallet base 7a and a vertical strut 7b for supporting the cylinder block 1 on the pallet base 7a in an intended attitude. Designated by numeral 9 is a sub-system including a piston and cylinder provided in association with the main-assembling line L1 for controlling the attitude of the cylinder block 1 on the positioning jig pallet 7.

On the side of the main-assembling line L1, opposite to the manipulator 8, is located a bolt supplying apparatus 10 which comprises a pair of parts-feeders 11a and 11b for continuously feeding coupling bolts 3a and 3b, respectively, and holder or means 13 for holding temporarily a set of coupling bolts 3a, 3b. The holding means is adapted to be displaced in any well known manner, for example, by means of an air cylinder 12, to a bolt pick-up station S1 shown by a double dotted dash line in FIG. 2. On the side of the sub-assembling line L2, opposite to the manipulator 8, is located a gasket storage station S2 wherein stacks of gaskets 4 are previously arranged.

Overhead the sub-assembling line L2 is a station S3 wherein disposed are a bolt gripper 14 having a mounting member 14A and a cylinder head gripper 15 having a mounting member 15A. Between the main-assembling line L1 and the manipulator 8 is a station S4 wherein a gasket gripper 16 having a mounting member 16A is disposed. Each mounting member 14A, 15A, 16A is adapted to be mounted on and demounted from a maneuverable manipulator hand 17A operatively supported by manipulator arm 17 of the program-controlled manipulator 8 in any well known manner. The mounting members 14A, 15A and 16A are arranged and located physically within the operating area or range of the manipulator arm 17 of the manipulator 8.

Reference is now had to FIGS. 4 and 5A to 5C showing in detail the bolt gripper 14 having the mounting member 14A which is adapted to be mounted on and demounted from the manipulator hand 17A of the manipulator 8 in any well known manner in the art, for example, using an electromagnetic chuck or air chuck. The bolt gripper 14 has a plurality of, for example, four in this embodiment, gripper heads 53 supported for sliding movement by a supporting plate 52 so as to permit the distances between gripping heads 53 to be adjusted to the distances or spacings between the threaded bores 28a and 28b of each series. For this sliding movement, the supporting plate 52 and each gripping head 53 are operationally joined to each other through dovetail 52A and dovetail groove 53A. As will be apparent to those skilled in the art, due to the provision of the dovetail joining mechanism, the gripping heads 53 can be either manually or automatically changed as to their relative positions to adjust the spacings or distances between them according to the distances or spacings of the series of the bolt receiving bores 28a and 28b.

Figure 5A:
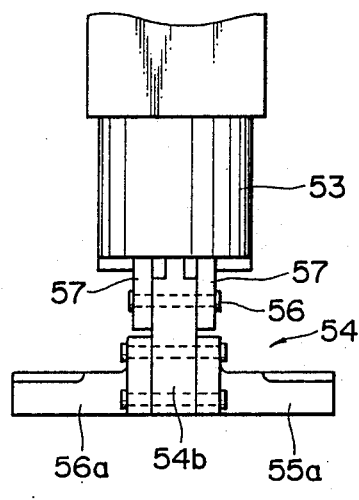
FIG. 5A is a side view of a bolt gripping head of the bolt gripper of FIG. 4.
Figure 5B:
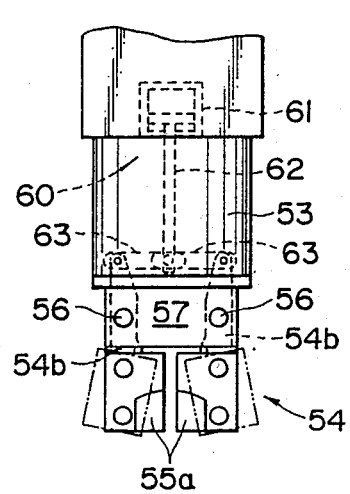
FIG. 5B is a front view of a bolt gripping head of the bolt gripper of FIG. 4.
Figure 5C:
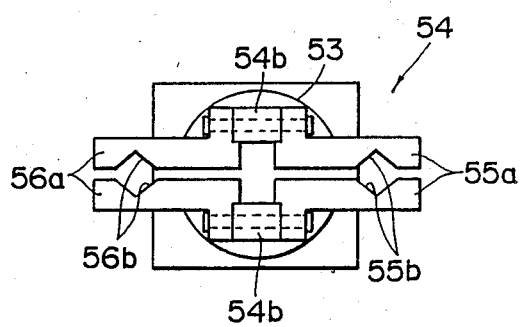
FIG. 5C is a bottom view of a bolt griping head of the bolt gripper of FIG. 4.

Each gripping head 53 has a gripping assembly 54 comprising a pair of arms 54b each of which cooperates with an actuator 60, and two pairs of clamping fingers 55a and 56a. The actuator 60 is incorporated in the gripping head 53 and, as is shown in FIG. 5B, for example, is comprised of an air cylinder 61 supplied from a suitable source, a reciprocating cylinder stem 62 connected with a piston in cylinder 61, and a pair of links 63. The links 63 are pivotally connected to the distal end of the cylinder stem 62 and the end of each arm 54b. As each arm 54b is pivoted approximately at the middle by a pivot 56 fixed between skirts 57 extending downwardly from the gripping head 53, the pair of arms 54b can make a pivotal movement to open and close according to reciprocal movements of the cylinder stem 62 as is shown in FIG. 5B.

Fixedly attached to each arm 54b on both sides thereof by pins are the pairs of clamping fingers 55a, 56a. Each pair of clamping fingers 55a, 56b is, therefore, capable of pivotally moving to open and close under the control of the actuator 60, so as to clamp and unclamp coupling bolts 3a, 3b held therebetween. In the inside wall of each finger 55a, 56a, there is formed a right angle clamping notch 55b, 56b for positively clapping the bolt in position. Specifically, when the actuator 60 is operated to cause the cylinder stem 62 to withdraw or retract upwardly, the links 63 force the arms 54b and, hence, the clamping fingers 55a and 56a, to pivot about pins 56 and open outwardly, as shown in dot dash lines in FIG. 5B, enough to receive the shank of a bolt 3a, 3b therebetween, but not sufficiently to receive the octagon head of a coupling bolt 3a, 3b or to allow the bolt head to slip through the notches 55b, 56b. The bolt gripper 14 is moved horizontally laterally to pick up bolts from holder 13 by positioning between the clamping fingers. The cylinder stem 62 is then protruded or projected to force the clamping fingers 55a, 56a to close and grip the shanks of the bolts; the cylinder stem 62 is then retracted and the links 63 force the arms 54b to pivot and close and to clamp firmly the shanks of coupling bolts positioned between the clamping fingers 55a, as is shown in FIGS. 6A and 6B.

Figure 7:
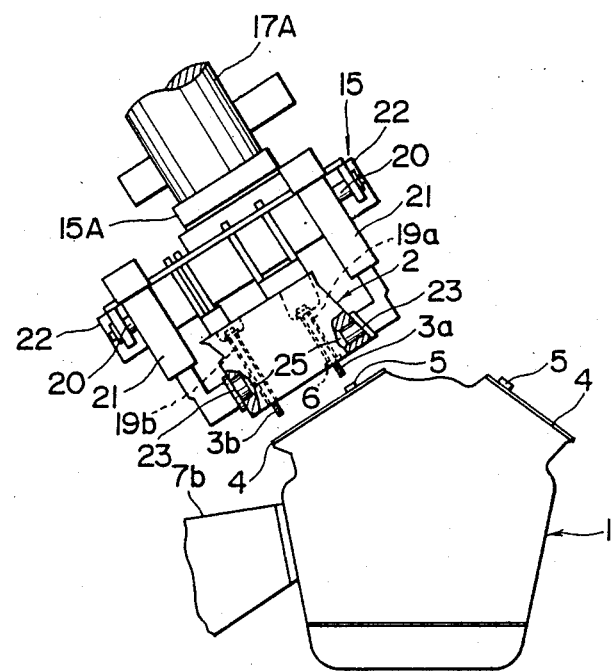
FIG. 7 is a fragmentary front view, on an enlarged scale, illustrating the component sections being fitted together.

As is shown in FIG. 7, the cylinder head gripper 15 has a mount 15A which is adapted to be mounted on and demounted from the manipulator hand 17A of the manipulator 8 in a manner well known in the art, for example, through use of an electromagnetically actuated chuck or an air actuated chuck. Cylinder head gripper 15 comprises a pair of clamping arms 21 supported in opposed face-to-face relation on a common guide rod 20 for sliding reciprocal movement along guide rod 20 to move toward and away from each other. This sliding movement of the clamping arms 21 relative to guide rod 20 is produced by means of cylinder assemblies 22 operatively connected to and provided, respectively, for effecting the desired movement of the clamping arms 21. Each clamping arm 21 is formed with a plug-like engaging nose 23 fittable into an exhaust port 25 of the cylinder head 2 for firmly clamping the cylinder head 2 to the cylinder head gripper 5.

Figure 8:
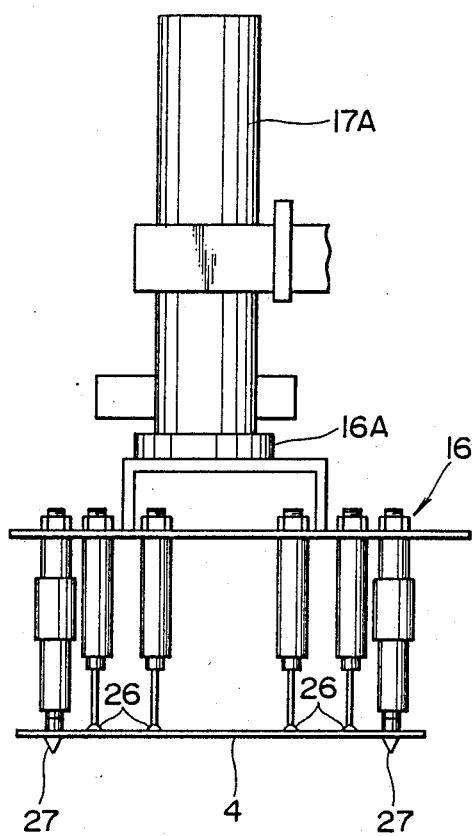
FIG. 8 is a schematic front view of a gasket gripper.

The gasket gripper 16 is shown in FIG. 8 and consists of a mounting member 16A which is adapted to be mounted on and demounted from the manipulator hand 17A of the manipulator 8 in any manner well known in the art, for example, an electromagnetic chuck or air chuck; a plurality of vacuum actuated suckers 26 to which the gasket 4 is drawn or attracted and held; and a pair of positioning poles 27, the distal ends of which are tapered to a point to be able to enter the annular locating pins 5 which are in the form of sleeve-shaped bushes in order to position the gasket 4 in the proper orientation and registry when placing the gasket 4 upon the cylinder block 1.

The fitting of the cylinder block 1 and the cylinder head 2 will now be described. The positioning jig pallet 7 conveyed on the conveyer of the main-assembling line L1 is placed at a predetermined or preselected fitting position. The cylinder head 2 is placed at another predetermined or preselected position on the conveyer of the sub-assembling line L2. Then, as the first step in a sequential control of operation, the manipulator 8 is actuated and program-controlled to mount, at first, the gasket gripper 16 disposed in the station S4 on the manipulator hand 17A through the manipulator arm 17 and to bring the manipulator hand 17A right overhead the gasket storage station S2. The manipulator 8 controls the manipulator arm 17 and hand 17A to align the pair of positioning poles 27 of the gasket gripper 16 with the index holes formed in a gasket 4 stacked in the gasket storage station S2. The gasket gripper 16 is then lowered to approach the gasket 4 with poles 27 protruding through the index holes as shown in FIG. 8. The suckers 26 are actuated to draw or attract gasket 4 to them and the gasket 4 is now held by the suckers 26 ready for transport. The manipulator arm 17 is operated to ascend and lift up the gasket gripper 16 with the gasket 4 held to it as shown in FIG. 8. At this time, because of the conical-shaped tip ends of the positioning poles 27 entering the index holes formed in the gasket 4, the gasket 4 is held in proper orientation and position relative to the gasket gripper 16.

The manipulator 8 successively operates the manipulator arm 17 to turn through approximately a right angle in the clockwise direction as viewed in FIG. 2 and to bring the gasket 4 right overhead the cylinder block 1 supported in position by the vertical strut 7b on the pallet base 7a as shown in FIG. 3. The manipulator arm 17 then gradually descends directing the conical-shaped tip ends of the positioning poles 27 toward the annular locating pins 5; gently thrusts the tip ends of the positioning poles 27 in the central openings of the positioning pins 5 which are in the form of sleeve-shaped bushes. The gasket gripper 16 then releases the gasket 4 by deactuating the suckers 26. Then, the manipulator arm 17 is lifted. As a result, the gasket 4 is superposed on the fitting surface 1A of the cylinder block 1 in proper registry. The locating pins 5 have a thickness greater than gasket 4 and, therefore, project above the gasket 4 through the index holes of the gasket 4 when the gasket 4 is set onto and lying on the fitting surface 1A of the cylinder block 1.

After the completion of setting the gasket 4 onto the cylinder block 1, the manipulator 8 operates the manipulator arm 17 to turn through a certain angle in the counterclockwise direction to the station S4. At the station S4, the manipulator hand 17A is caused to demount and return the gasket gripper 16 to its storage position.

Following the demounting of the gasket gripper 16, the manipulator 8 operates again the manipulator arm 17 to turn in the counterclockwise direction toward the station S3 in order to mount the bolt gripper 14 on the manipulator hand 17A. After the mounting of the bolt gripper 14 on the manipulator hand at the station S3, the manipulator 8 controls the manipulator arm 17 to turn through approximately a right angle in the clockwise direction as viewed in FIG. 2 in order to pick up at first a set of bolts 3b held in a line by the holding means 13 at the station S1. Thereafter, as the next sequential step in the operation of control, the actuators 60 are operated to retract the cylinder stems 62 to cause the pairs of arms 54b, and hence the fingers 55a and 56a, to open slightly outwardly through the pivotal actuation of links 63. Either simultaneously with or after the outward opening of the fingers 55a and 56a, the manipulator arm 17 brings the bolt gripper 14 horizontally to the set of coupling bolts 3b held in a line and the fingers 56a are placed to position the bolts 3b between the clamping notches 56b thereof. The actuators 60 then protrude the cylinder stems 62, causing the fingers 55a and 56a to close to clamp the coupling bolts 3b at their shanks as is shown in FIGS. 6A and 6B. In this way, the set of coupling bolts 3b are grasped all at once by the gripping heads 53.

Figure 9A:
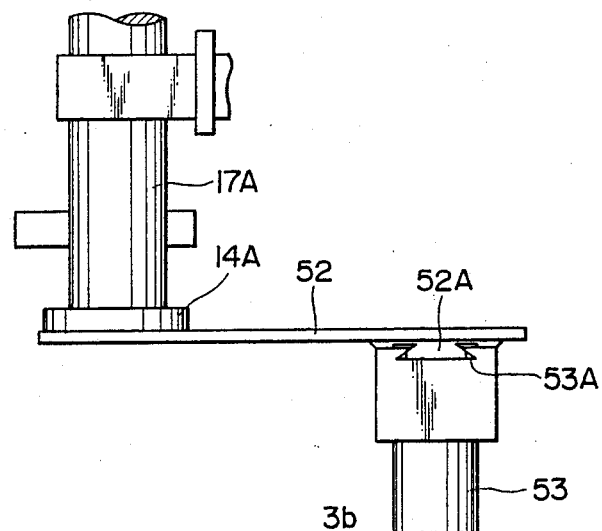
FIGS. 9A and 9B are explanatory illustrations showing the bolt gripper during setting coupling bolts.

The manipulator 8 operates the manipulator arm 17 to ascend and bring the bolt gripper 14 overhead the cylinder head 2 placed in position on the sub-assembling line L2 through approximately a right angle in the counterclockwise direction as viewed in FIG. 2. Then, arm 17 gradually descends to insert the set of clamped coupling bolts 3b into the outer series of bolt receiving bores 19b formed in the cylinder head 2. When the respective coupling bolts 3b are inserted into the respective bolt receiving bores 19b to approximately half the depth of the bolt receiving bores 19b, then actuators 60 are caused to open the fingers 55a and 56a again slightly outwardly to unclamp the bolts 3b. At this time, however, each bolt 3b by its bolt head is still suspended by the clamping fingers 56b. Following this bolt insertion operation, the manipulator 8 controls the manipulator arm 17 to move horizontally laterally, shifting the gripping fingers 56b in a direction shown by an arrow in FIG. 9A away from the coupling bolts 3b and the cylinder block 1, permitting, as an evitable result, each bolt 3b to fall fully into each bolt receiving hole 19b.

Figure 9B:
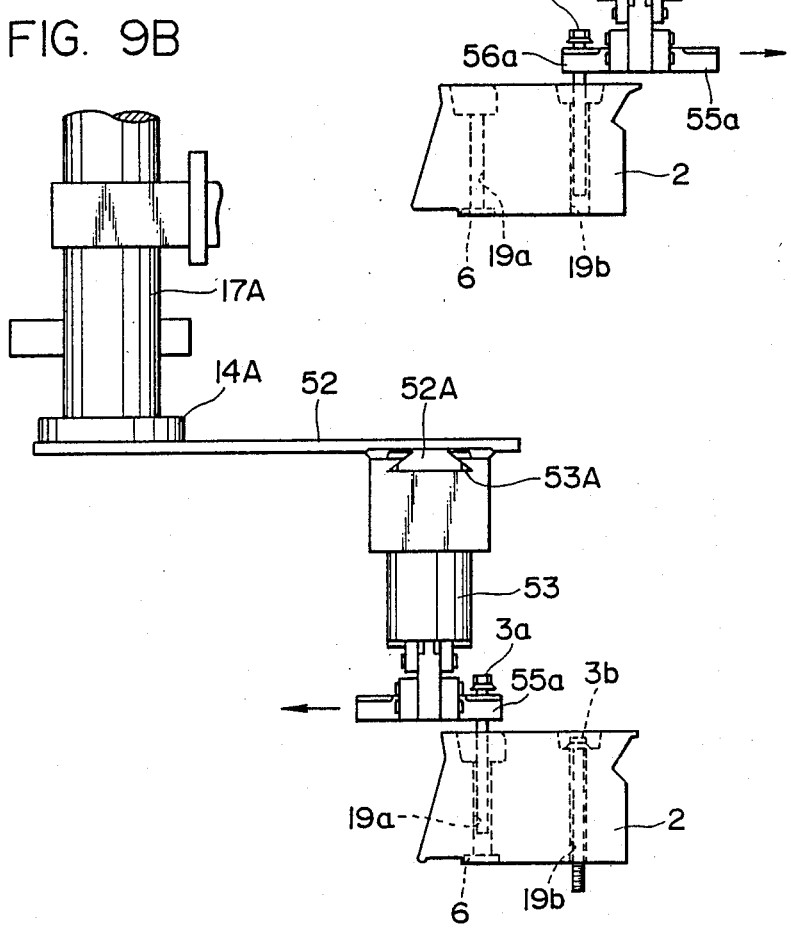

As the next sequential control of operation, the manipulator 8 repeats the same step for the next sequential operation but this time picks up the set of bolts 3a. However, the manipulator 8 operates the manipulator arm 17 in such a way that the gripping heads 53 with the set of coupling bolts 3a grasped by the series of clamping fingers 55a approach the cylinder head 2 from the opposite side and, after the unclamping of the set of coupling bolts 3a, shift horizontally laterally in the opposite direction as shown by an arrow in FIG. 9B away from the cylinder head 2. After the insertion of the set of bolts 3a into the series of bolt receiving bores 19a, the manipulator 8 operates the manipulator arm 17 to turn through approximately a right angle in the counterclockwise direction to the station S3. At the station S3, the manipulator hand 17A is caused to demount the bolt gripper 14 and return it to its storage position. Then the manipulator 8 controls the manipulator hand 17A to mount the cylinder head gripper 15 thereon.

The manipulator 8 again operates the manipulator arm 17 to bring the cylinder head gripper 15 right overhead the cylinder head 2 with the bolts 3a and 3b placed in and projecting through the bolt receiving bores 19a and 19b. The cylinder head 2 is in position on the sub-assembling line L2. Manipulator 8 then operates to bring down gradually the cylinder head gripper 15 in order to clamp the cylinder head 2 by the clamping arms 21. After clamping the cylinder head 2 to cylinder head gripper 15, the manipulator 8 operates the manipulator arm 17 to turn through approximately a right angle in the clockwise direction as viewed in FIG. 2 to place the cylinder head 2 right overhead the cylinder block 1 which has the gasket 4 mounted thereon and is being supported in the proper attitude by the vertical strut 7b. The cylinder head gripper 15 is controlled, first, to bring the projecting coupling bolts 3a and 3b in alignment with the threaded bores 28a and 28b in the cylinder block 1, respectively, and, then, to gradually lower and approach the cylinder head 2, to thereby insert the coupling bolts 3a and 3b into the threaded bores 28a and 28b. As a result, the cylinder head 2 will be properly mounted onto the cylinder block 1. This is especially so because the coupling bolts 3a, which project out of the two outermost bolt receiving bores 19a, enter outermost threaded bores 28a via the annular sleeve-shaped bushes which serve as locating pins 5. When the projecting bolts 3a enter threaded bores 28a, pins 5 which project above the gasket 4 will be received in the recesses 6 formed as enlargements at the lower end of the outermost bolt receiving bores 19a. The locating pins 5, being received and fitted into the recesses 6, ensure that the cylinder block 1 and the cylinder head 2 will be superposed in proper registry. The manipulator 8 now operates to release cylinder head 2 and to bring the manipulator arm 17 with cylinder head gripper 15 attached to station S3 and there to demount and return cylinder head gripper 15 to its storage position.

The engine body composed of the cylinder block 1 and the cylinder head 2 fitted together is transferred to the next stage of the assembly process in order for these components to be rigidly fixed by fastening the coupling bolts with the aid of, for example, an automatic bolt or screw driver, well known per se in the art. In consequence, the engine body is completely assembled as an integral whole.

Figure 11:
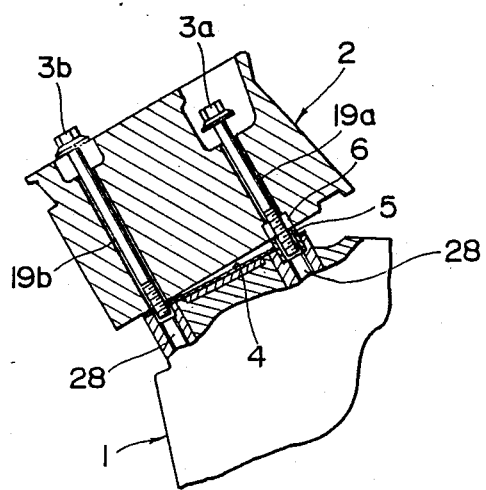
FIG. 11 is a partially sectional fragmentary schematic illustration of the component sections improperly fitted together.

Even though there possibly may occur an improper engagement between the locating pins 5 and the recesses 6 due to an operational error in the fitting process such as is illustrated in FIG. 11, nevertheless, the cylinder head 2 is maintained sufficiently coupled to the cylinder block 1 by means of the coupling bolts 3a and 3b. Therefore, when the temporarily assembled engine body is transferred to the next station in the assembly line, even though an improper engagement exists between the locating pins 5 and the recesses 6, there is no danger of any accidental dislodgement such that the cylinder head 2 slips off and falls down from the cylinder block 1.

Although the description of the present invention has been directed to the preferred embodiment of fitting engine cylinder block 1 and cylinder head 2, it is to be understood that various changes and modifications are apparent to those skilled in the art which do not depart from the scope of the present invention. Such changes and modifications are deemed to fall within the purview of the present invention.

What is claimed is:

1. A method of fitting a cylinder block and a cylinder head together at a plane which is inclined to the horizontal prior to rigidly fixing, and thereby assembling, said cylinder block and cylinder head with coupling bolts into a V-type automobile engine body having two series of cylinder bores in an automatic assembling line, said cylinder block and cylinder head being provided with mutually coacting locating means in their fitting surfaces to bring said cylinder block and cylinder head into proper registry, said method comprising:
   placing a cylinder block at a predetermined position relative to an automatic assembling line, said cylinder block being provided with an inclined fitting surface formed with coupling bolt engaging bores having a circular recess with a diameter larger than that of said engaging bores;
   inserting coupling bolts through and protruding out of coupling bolt receiving bores formed in a fitting surface of a cylinder head placed at a preselected different position by means of a manipulator, said manipulator including gripping means having a plurality of clamping fingers for holding said coupling bolts;
   setting the fitting surface of said cylinder head in juxtaposition to the fitting surface of said cylinder block by means of said manipulator while inserting the protruding portion of said coupling bolts into one of said circular recesses and said coupling bolt engaging bores;
   mutually coacting said locating means of said cylinder block and said cylinder head to bring said cylinder block and said cylinder head into proper registry with said coupling bolts received in one of said circular recesses to couple said cylinder block and said cylinder head temporarily together; and
   tightening said coupling bolts into said coupling bolt engaging means to rigidly fix said cylinder block and cylinder head together, whereby assembling them into one whole engine body.

2. A method as defined in claim 1 wherein said locating means is a projection disposed on said cylinder block between said two series of cylinder bores.

3. A method as defined in claim 1, further comprising transferring said cylinder block and cylinder head temporarily coupled together to another preselected position relative to said automatic assembling line and there tightening said coupling bolts to form them into one whole engine body.

4. A method as defined in claim 1, wherein said protruding portion of said coupling bolt is longer than said locating means.

5. A method as defined in claim 1, wherein said mutually coacting means comprises a locating projection and a recess for receiving said locating projection.

6. A method as defined in claim 5, wherein said locating projection and said recess are formed in each of said fitting surfaces of said cylinder block and cylinder head.

7. A method as defined in claim 5, wherein said locating projection has an annular form and coaxially aligned with said coupling bolt engaging means.

8. A method as defined in claim 5, wherein said circular recess is coaxially aligned with said coupling bolt receiving bore.

9. A method as defined in claim 5, wherein said locating projection is disposed on said cylinder block between said two series of cylinder bores.

10. A method of fitting two component sections together prior to rigidly fixing, and thereby assembling, said two component sections with two sets of coupling bolts into one whole integral body in an automatic assembling line, said method comprising:
   placing one of said two component sections at a preselected position relative to said automatic assembling line, said one component section being formed with two series of bolt engaging bores with which coupling bolts are engageable;

gripping and inserting by means of a gripping hand of a manipulator, said manipulator including gripping means having a plurality of clamping fingers for holding said coupling bolts, one of two sets of coupling bolts being inserted, at first, through one of two series of bolt receiving bores formed in the other component section and, then, the remaining set of coupling bolts through the remaining series of bolt receiving bores; and setting said other component section upon said one component section by means of said manipulator while inserting said coupling bolts through said bolt receiving bores into said bolt engaging bores.

11. A method as defined in claim 10, wherein said gripping hand has two series of clamping fingers one for each of said two sets of coupling bolts, said clamping fingers clamping each of said coupling bolts at their shank.

12. A method as defined in claim 11, wherein said gripping hand operates said clamping fingers to unclamp said coupling bolts after partially inserting into said bolt receiving bores and, thereafter, moves horizontally laterally to release said unclamped bolts which then fall fully in said bolt receiving bores.

13. A method of setting two sets of coupling bolts in two series of bolt receiving bores formed in a cylinder head which is to be fitted to a cylinder block of an engine body by means of a manipulator hand of a manipulator prior to rigidly fixing, and thereby assembling, said cylinder block and cylinder head into an engine body, said manipulator hand including gripping means comprised of two series of clamping fingers, said method comprising:

gripping and inserting one of two sets of coupling bolts into one of two series of bolt receiving bores formed in a cylinder head by one of two series of clamping fingers from one side of said cylinder head; and gripping and inserting the remaining set of coupling bolts into the other series of bolt receiving bores by the other series of clamping fingers from the opposite side of said cylinder head.

14. A method as defined in claim 13, wherein said fingers clamp said coupling bolts at their shanks.

15. A method as defined in claim 14, wherein said gripping means operates said clamping fingers to unclamp said coupling bolts after partially inserting into said bolt receiving bores and thereafter to move horizontally laterally to release said unclamped coupling bolts which then fall fully into said bolt receiving bores.

16. Apparatus for setting by a manipulator two sets of coupling bolts in two series of bolt receiving bores formed in one component section, said one component section being fitted to another component section prior to rigidly fixing, and thereby assembling, said two component sections into one whole body in an automatic assembling line, said apparatus comprising:

manipulator means for picking up various coupling means and manipulating same, bolt gripping means to be picked up and released from said manipulator means, said bolt gripping means including a plurality of gripping heads and two series of clamping fingers attached to said gripping heads and extending out on both sides thereof, each of said series of clamping fingers having means for releasably clamping one set of coupling bolts.

17. Apparatus as defined in claim 16, wherein said plurality of gripping heads are supported on said bolt gripping means for sliding movement to enable adjustment of the spacing or distance between adjacent gripping heads according to the spacing or distance between adjacent bolt receiving bores.

18. Apparatus as defined in claim 16, wherein said clamping fingers open by pivoting slightly outwardly.

19. Apparatus as defined in claim 16, wherein said component sections are a cylinder head and a cylinder block of an automobile engine body.

20. Apparatus as defined in claim 16, further including control means for controlling the manipulator means to first pick up said coupling bolts, placing said coupling bolts into said bolt receiving bores of said one component section, with said coupling bolts protruding, next, bring the one component section into juxtaposition with said another component section and inserting the protruding portion of said coupling bolts into said bolt engaging bores of said another component section.

21. Apparatus as defined in claim 20, further including program means to program the actions of the control means automatically.

22. A method of fitting two component sections together at a plane which is inclined to the horizontal prior to rigidly fixing, and thereby assembling, said two component sections with coupling bolts into one whole integral body in an automatic assembling line, said first component section being provided with a locating projection and said second component section being provided with a locating recess for receiving said projection to bring said two component sections into proper registry, said method comprising:

placing a first component section at a predetermined position relative to an automatic assembling line, said first component section being provided with an inclined fitting surface formed with coupling bolt engaging means coaxially aligned with said locating projection;

inserting coupling bolts through and protruding out of bolt receiving bores formed in an inclined fitting surface of a second component section placed at a preselected different position by means of a manipulator, said manipulator including gripping means having a plurality of clamping fingers for holding said coupling bolts; and setting the fitting surface of said second component section in juxtaposition to the fitting surface of said first component section by means of said manipulator while inserting the protruding portion of said coupling bolts into the coupling bolt engaging means and while mutually coacting said locating means to bring said component sections into proper registry with said coupling bolts received in said coupling bolt engaging means to secure said component sections temporarily together until said coupling bolts are tightened to form them into one whole integral body.

23. A method as defined in claim 22, wherein said recess is coaxially aligned with said bolt receiving bores.

24. A method as defined in claim 22, wherein said projection is a sleeve-like bush fitted into a bore constituting part of said bolt engaging means.

25. A method of fitting a cylinder block and a cylinder head together at a plane which is inclined to the horizontal prior to rigidly fixing, and thereby assembling, said cylinder block having two series of cylinder bores and cylinder head with coupling bolts into one automobile engine body in an automatic assembling line, said cylinder block being provided with a locating projection disposed between said two series of cylinder bores and said cylinder head being provided with a recess for receiving said locating projection to bring said cylinder block and cylinder head into proper registry, said method comprising:

placing a cylinder block at a predetermined position relative to an automatic assembling line, said cylinder block being provided with an inclined fitting surface formed with coupling bolt engaging means;

inserting coupling bolts through and protruding out of bolt receiving bores formed in an inclined fitting surface of a cylinder head placed at a preselected different position by means of a manipulator, said manipulator including gripping means having a plurality of clamping fingers for holding said coupling bolts; and setting the fitting surface of said cylinder head in juxtaposition to the fitting surface of said cylinder block by means of said manipulator while inserting the protruding portion of said coupling bolts into the coupling bolt engaging means and while mutually coacting said locating means to bring said cylinder block and cylinder head into proper registry with said coupling bolts received in said coupling bolt engaging means to secure said cylinder block and cylinder head temporarily together until said coupling bolts are tightened to form them into one whole integral body.

* * * * *